United States Patent [19]

Paudice et al.

[11] 4,339,259

[45] Jul. 13, 1982

[54] PROCESS AND APPARATUS FOR BENDING AND TEMPERING GLASS SHEETS, ESPECIALLY THIN SHEETS

[75] Inventors: Ciro Paudice; Vitantonio Sassanelli; Dino Di Nocco; Francesco Pracilio; Nicolo' Casa, all of Vasto, Italy

[73] Assignee: Societa' Italiana Vetro-Siv-S.p.A., San Salvo, Italy

[21] Appl. No.: 211,721

[22] Filed: Dec. 1, 1980

[30] Foreign Application Priority Data

Dec. 7, 1979 [IT] Italy ............................... 27967 A/79

[51] Int. Cl.³ .................... C03B 23/023; C03B 27/00
[52] U.S. Cl. ...................................... 65/104; 65/106; 65/273; 65/349; 65/351
[58] Field of Search ................ 65/104, 106, 273, 349, 65/351

[56] References Cited

U.S. PATENT DOCUMENTS

| | | | |
|---|---|---|---|
| 3,294,516 | 12/1966 | Carson et al. | 65/273 |
| 3,338,695 | 8/1967 | Ritter, Jr. | 65/104 |
| 3,573,889 | 4/1971 | McMaster et al. | 65/62 |
| 3,607,200 | 9/1971 | McMaster | 65/182 |
| 3,684,473 | 8/1972 | Ritter, Jr. | 65/104 |
| 3,734,706 | 5/1973 | Ritter, Jr. | 65/104 |
| 3,846,104 | 11/1974 | Seymour | 65/104 |
| 3,846,106 | 11/1974 | Seymour | 65/114 |
| 4,092,141 | 5/1978 | Frank et al. | 65/114 |
| 4,204,853 | 5/1980 | Seymour | 65/106 |

FOREIGN PATENT DOCUMENTS

| | | |
|---|---|---|
| 2400296 | 7/1974 | Fed. Rep. of Germany . |
| 1474251 | 6/1967 | France . |
| 2046790 | 12/1971 | France . |
| 65146 | 7/1972 | Luxembourg . |

*Primary Examiner*—Arthur D. Kellogg
*Attorney, Agent, or Firm*—Wenderoth, Lind & Ponack

[57] ABSTRACT

Bending and tempering of a glass sheet is achieved in that the glass sheet is submitted to the tempering phase while still being placed, as in the forming phase, on a forming ring integral with a frame which holds the latter, in order to maintain the previously formed shape unaltered. Vertical upward and downward movement is achieved both in the forming zone and in the glass sheet discharge zone by means of a rotating coupling device which supports the frame with forming ring and the glass sheet placed thereupon. Means are provided for conveying the frame with integral forming ring in the horizontal direction from the forming zone to the subsequent tempering and discharge zones, and other overlying similar means are provided to return the frame and forming ring from the discharge zone to the forming zone. A passageway or chamber is formed in the upper nozzle section of the tempering zone, through which may pass the frame and forming ring, as well as their horizontal driving members during the return traverse.

10 Claims, 3 Drawing Figures

PROCESS AND APPARATUS FOR BENDING AND TEMPERING GLASS SHEETS, ESPECIALLY THIN SHEETS

BACKGROUND OF THE INVENTION

The present invention relates to the production of curved and tempered (toughened) glass, especially thin sheets.

Such products are frequently used as windows for vehicles in general, more especially for automobiles.

This application requires that the windows be accurately made, both as regards the required dimensions and tolerances of curvature, as well as the configuration to correspond to the general shape of the vehicle body.

Moreover, it is necessary that the visibility through such windows should not be impaired by optical distortions or by flaws in the glass.

As is well known, tempered glass sheets, especially those used in the automobile industry, can also be manufactured by horizontal machines which permit high outputs.

In these machines, each glass sheet is conveyed horizontally by a roller conveyor during the consecutive heating, forming (if required) and tempering phases.

In the case of curved glass sheets, these sheets are collected at the output of a forming press which forms them into the required shape.

After the forming operation, the piece leaves the forming press and passes on to the tempering zone via a roller conveyor.

In order for a piece to be efficiently tempered, it must still retain a certain degree of plasticity.

This plasticity, which is an essential condition for tempering, inevitably leads to deformation of the shape previously assumed by the glass when submitted to treatment in the forming press.

Causes of deformation are essentially as follows:
(a) the glass's own weight
(b) inertia of the glass sheet
(c) action of the first blasts of hot air in the tempering zone
(d) any assymmetrical cooling between the upper and lower sides of the glass sheet.

It should be noted that the thinner is the glass sheet, the greater is the risk of deformation, since, whilst it is true that the weight and inertia decrease in proportion with the decrease in thickness of the glass sheet, it is also true that resistance to deformation decreases more or less with the cube of the thickness of the glass sheet.

The deformation due to the hot blast of air during tempering is also very marked.

During recent years, much commercial importance has been placed on thinner and thinner curved tempered glass sheets, with thicknesses passing from 5–6.5 mm down to 2.5–4 mm.

Consequently, a bending process such as that described above in which the piece travels on a roller conveyor, is particularly affected by the decrease in thickness since the resistance to deformation decreases more or less with the cube of the thickness.

The stepping up of blasts of hot air for tempering which is necessary on account of the higher temperature gradient required by the thinner glass sheets contributes, in turn, to the lower structural resistance, thereby making it difficult to control the shape of the product which, after forming, is still in the plastic state.

SUMMARY OF THE INVENTION

Hence, the present invention provides a bending and tempering process for a glass piece which is still highly plastic when it emerges from the furnace, in order to safeguard both the shape within the required tolerances, and the optical properties of the glass itself, as well as to the desired degree of toughness.

The purpose of the present invention is, in fact, to provide a process and apparatus capable of protecting the glass sheets against the action of the aerodynamic forces which have considerable effect on the poor structural resistance of the glass sheets and also of achieving the required forming and tempering conditions, not to mention the optical properties.

The process in accordance with the invention can be summed up as follows:

(a) first of all, the glass sheet, on leaving the furnace, is conveyed on suitable conveyor rolls to the forming zone;

(b) a shaped ring, supported by side arms connected by cross members sliding from top to bottom, then lifts the glass sheet from the rolls and the mould with the assistance (if required) of an overlying male member;

(c) the same ring is then rapidly conveyed with the as-formed glass sheet to the tempering zone where it is submitted to the desired rise in temperature;

(d) the ring then releases the glass sheet, which is by now rigid and toughened, on to other conveyor rolls; as soon as the ring releases the glass sheet, it returns to the furnace inlet passing through the passageway incorporated in the upper nozzle section of the tempering zone.

BRIEF DESCRIPTION OF THE DRAWINGS

The accompanying drawings, which are to be considered as an exemplication of the principles of the invention and are not intended to limit it, illustrate a preferred embodiment of the apparatus in accordance with the invention.

In the drawings.

DETAILED DESCRIPTION OF THE INVENTION

In the following description, the longitudinal direction is considered to be that parallel to the direction of movement of the glass sheet, the cross direction to be, the direction perpendicular to it, and the vertical direction to be the direction normally taken as being vertical.

Figure 1:
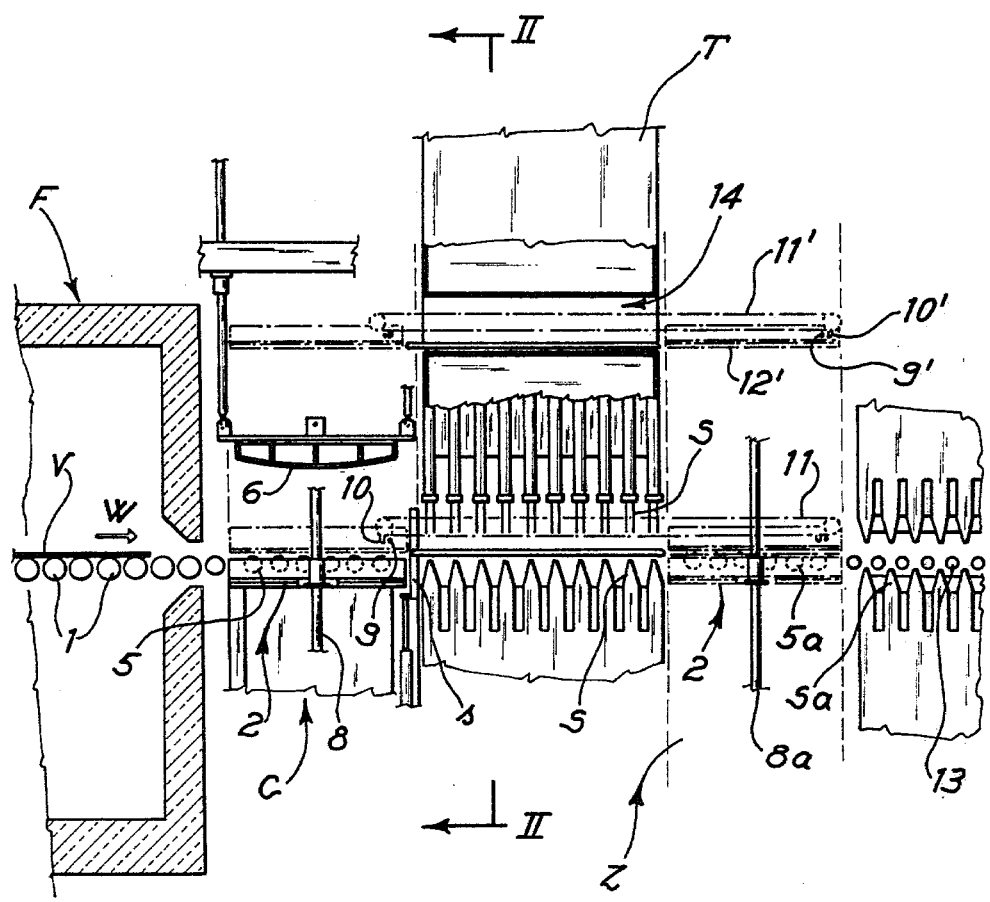
FIG. 1 is an elevation view, partially in section, of the apparatus.

As can be seen from the drawings (FIG. 1), the glass sheet, which has been previously heated to the softening point in furnace F is conveyed by rolls 1 in the direction of arrow W until reaching frame 2, whereupon it is rested on other rolls 5.

Frame 2 can be made of any suitable material provided it has good resistance to heat and low specific weight.

Figure 3:
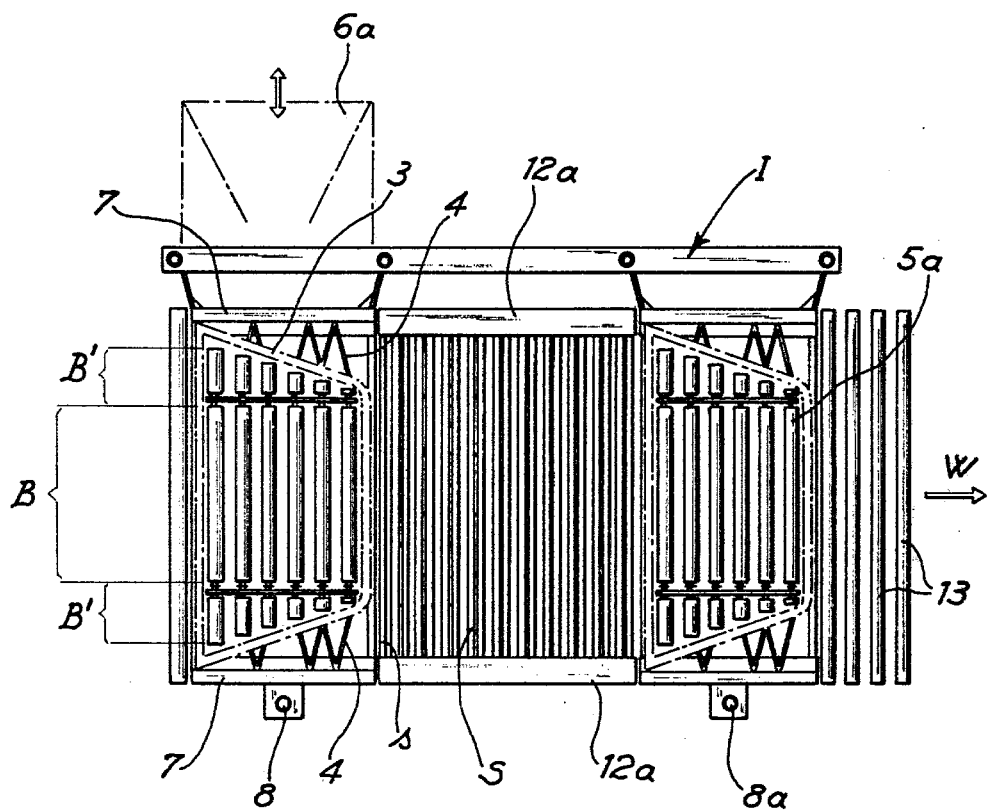
FIG. 3 is a plan view of the apparatus itself.

The frame supports, in turn (FIG. 3), the actual forming ring 3.

The connections 4 between forming ring 3 and frame 2 are designed so as to permit all the necessary adjustments and registrations required for setting up the forming phase of glass sheet V.

Once the glass sheet V is placed on the vertical of frame 2 and on that of forming ring 3, frame 2 passes beyond conveyor rolls 5 and is raised upwards, thereby permitting (with the assistance, if required, of male member 6 located above) glass sheet V to be formed according to the desired degree of curvature.

Figure 2:
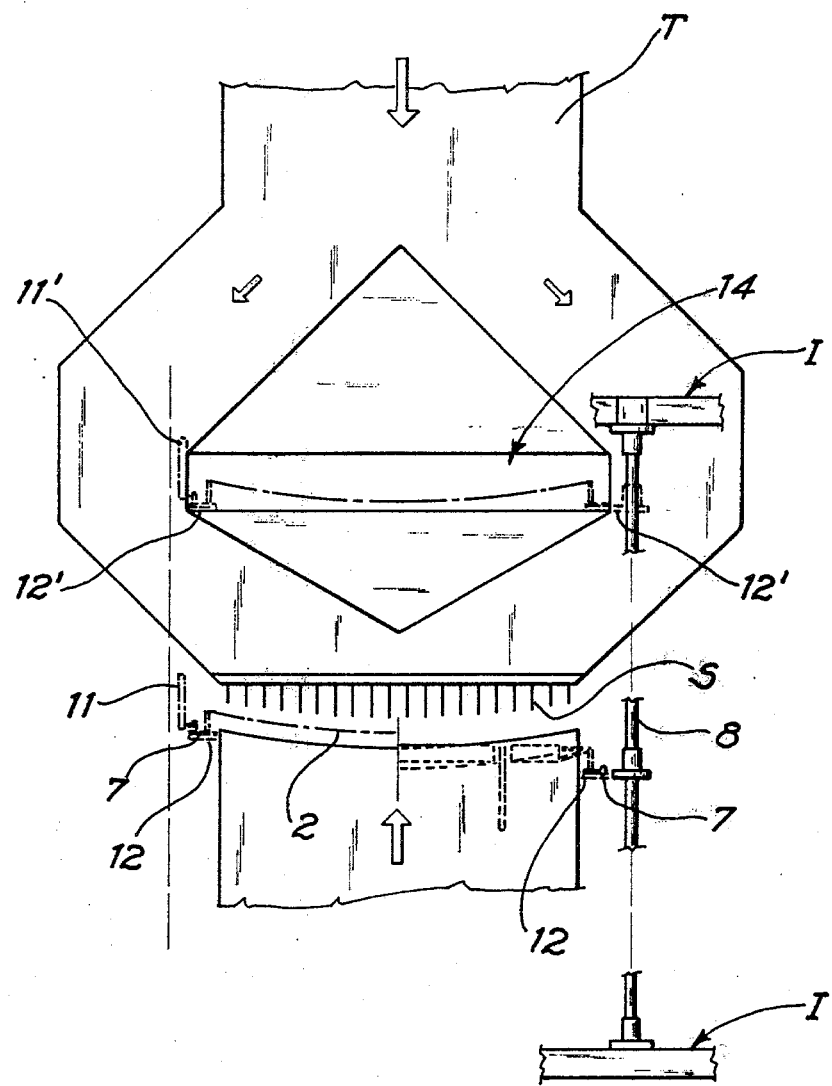
FIG. 2 is a cross sectional view of the apparatus taken along the lines II—II of FIG. 1.

The forming frame 2 is rested, in actual practice, (FIG. 2) on two cross blocks 7 which, in turn, rest upon two vertical mobile tracks 12 which impart a rise and fall movement to frame 2.

Such vertical movement is preferably driven through a device 8 consisting of a rotating screw with moving screw nut.

After the forming phase, the frame 2, including integral forming ring 3 and glass sheet V which is by now formed but still in the plastic state, as coupled to pin 9 of tooth 10 which, when moved by chain 11, causes frame 2 to travel on another pair of fixed tracks 12a.

Chain movement 11 is powered by electric stepping motors (not shown in the drawings).

Frame 2 moves along tracks 12a and passes nozzles S of the tempering zone; after which, a gate separating the forming and tempering zones, is automatically lowered.

The speed at which frame 2 travels under nozzles S of the tempering zone depends on the temperature of glass sheets V, on the air flow rate of nozzles S, and on the required degree of tempering.

Air blowing pressure in the tempering zone is around 1500 to 2000 mm $H_2O$, while the rate of travel under nozzles S is about 0.07 to 0.15 m/s.

Glass sheet V therefore remains securely attached to frame 2 and forming ring 3, and hence it is submitted, in a most original way, to an accurate vibration-free movement during the delicate holding phase of the mould at high temperature.

In this way, the action of the aerodynamic forces during tempering and the less adequate holding means, such as the conveyor rolls, are prevented from determining irregular and unexpected deformations, or at least deformations difficult to control.

As a result, glass sheet V is hardened and consolidated through the heat treatment into the previously assumed shape.

After leaving nozzles S of the tempering zone, frame 2 loaded with glass sheet V travels towards the glass sheet discharge zone Z.

When the cooling nozzles Sa are reached, frame 2 is lowered under conveyor rolls 5a through vertical traversing device 8a which is similar to device 8 in the forming zone.

The as-formed and tempered glass sheet V is released, during the downwards traverse of frame 2, on to the rolls 5a.

These latter items are arranged to deliver glass sheet V to other rolls 13 on which it is conveyed through cooling nozzles section Sa.

Finally the finished product is discharged from the machine.

Average duration of the above described work cycle is from 4 to 5 seconds; hence it can well meet the required output rhythm and productivity.

Frame 2, after discharging the glass sheet, is then raised automatically until reaching the same level as track 12' ready for its return to the outlet of furnace F.

A passageway 14 in the upper nozzle section S of the tempering zone allows the frame 2 to pass through during its return travel.

Air supply pipes T are adequately dimensioned in this zone so as not to allow the amount and pressure of air during the tempering phase to decrease.

The return traversing system for frame 2 is identical to that described previously for the forward traverse, with analogous members, that is, pin 9', tooth 10' and chain 11'.

When frame 2 reaches the outlet of furnace 2 it is always automatically lowered down to the lower level, that of conveyor rolls 5, ready for the next work cycle.

In order to allow lowering of frame 2 into the loading position, male member 6 is provided with a horizontal traversing device which traverses it to position 6a thereby retracting it from the path of frame 2 when the latter is on its way to the outlet of furnace F.

The same device traverses male member 6 back to its vertical position on frame 2 ready for the forming operation.

When frame 2 is positioned ready to pick up glass sheet V, it is actually (FIG. 1) under conveyor rolls 5.

The latter conveyor rolls (FIG. 3) are likewise arranged in a typical way, that is, in distinct sections, a central section B of constant length, and two side sections B' whose length varies according to requirements.

We claim:

1. A process for bending and tempering glass sheets, particularly thin glass sheets, in a glass treatment system of the type including a furnace for heating a glass sheet to the softening point thereof, a forming zone for bending the softened glass sheet into a desired shape, a tempering zone for tempering the shaped glass sheet, and a discharge zone for discharging the shaped and tempered glass sheet, said process comprising;

conveying said glass sheet through said furnace and from said furnace to said forming zone by means of roller conveyors;

at said forming zone, supporting said softened glass sheet on a ring carried by a frame, raising said frame, said ring and said softened glass sheet to a level above said roller conveyors, and bending said softened glass sheet to form said shaped glass sheet;

moving said frame, said ring and said shaped glass sheet horizontally at said level from said forming zone through said tempering zone, and therein tempering said shaped glass sheet to form said shaped and tempered glass sheet, to said discharge zone, said operation of moving being conducted in a single longitudinal direction without vertical or transverse displacement of said frame, said ring and said glass sheet;

at said discharge zone, lowering said frame, said ring and said shaped and tempered glass sheet from said level, and transferring said shaped and tempered glass sheet to discharge roller conveyors; and operating said discharge roller conveyors and thereby discharging said shaped and tempered glass sheet.

2. A process as claimed in claim 1, wherein said operation of moving comprises coupling said frame to a horizontally moving conveyor, and operating said conveyor at said level to transport said frame, said ring and said glass sheet to said discharge zone.

3. A process as claimed in claim 1, further comprising, after said operations of transferring said glass sheet to said discharge roller conveyors and discharging said glass sheet, raising said frame and said ring, returning said frame and said ring to said forming zone, and lowering said frame and said ring to a position below said roller conveyors, to thereat await receipt of a new softened sheet from said furnace.

4. A process as claimed in claim 3, wherein said operation of returning said frame and said ring includes coupling said frame to a horizontally moving conveyor and operating said conveyor at a position above said level to move said frame and said ring along a horizontal path including a passageway through said tempering zone.

5. A process as claimed in claim 4, wherein said process, from discharge of said softened glass sheet from said furnace to said discharge of said shaped and tempered glass sheet by said discharge roller conveyors, is conducted in from 4 to 5 seconds.

6. In an apparatus for bending and tempering glass sheets, particularly thin glass sheets, said apparatus being of the type including a furnace for heating a glass sheet to the softening point thereof, a forming zone for bending the softened glass sheet into a desired shape, a tempering zone for tempering the shaped glass sheet, and a discharge zone for discharging the shaped and tempered glass sheet, the improvement comprising:

roller conveyor means for conveying said glass sheet through said furnace to said forming zone;

a ring, carried by a frame, at said forming zone for supporting said softened glass sheet;

vertical raising means at said forming zone for raising said frame, said ring and said softened glass sheet supported thereby to a level above said roller conveyor means, whereat said softened glass sheet is formed into said shaped glass sheet;

means for moving said frame, said ring and said shaped glass sheet horizontally at said level in a single longitudinal direction without vertical or transverse displacement from said foming zone through said tempering zone, wherein said shaped glass sheet is tempered to form said shaped and tempered glass sheet, to said discharge zone;

discharge roller conveyors at said discharge zone; and vertical lowering means at said discharge zone for lowering said said frame, said ring and said shaped and tempered glass sheet from said level and for transferring said shaped and tempered glass sheet to said discharge roller conveyors.

7. The improvement claimed in claim 6, wherein each said vertical raising means and said vertical lowering means comprises at least one vertically extending rotable threaded rod, a nut threaded onto said rod and vertically movable upon rotation of said rod, and a coupling member supported by said nut for engagement with said frame during vertical movement of said nut.

8. The improvement claimed in claim 6, wherein said moving means comprises a horizontally movable conveyor at said level, and coupling means for connecting said frame to said horizontally movable conveyor.

9. The improvement claimed in claim 6, further comprising means for, after said glass sheet is lowered and discharged, returning said frame to said forming zone along a horizontal path at a position above said level.

10. The improvement claimed in claim 9, wherein said path includes a passageway through an upper portion of the structure of said tempering zone.

* * * * *